Patented Oct. 29, 1935

2,019,208

UNITED STATES PATENT OFFICE 2,019,208

REFRACTORY PRODUCT

Henry N. Baumann, Jr., and Charles McMullen, Niagara Falls, N. Y., assignors to The Carborundum Company, Niagara Falls, N. Y., a corporation of Pennsylvania No Drawing. Application December 16, 1933, Serial No. 702,798

4 Claims. (Cl. 75—22.5)

This invention relates to refractory products, and particularly to substances which are resistant to spalling and to other severe conditions which tend to be destructive to fused refractories. It is known that fused cast refractories are excellent for resisting slag attack; but they have had a very limited application due to their inability to stand heat shock, a factor which has made them unsatisfactory for many furnace applications.

This invention relates to magnesium-oxide-aluminum-oxide fusions, and particularly to compositions which, when made according to our new method, form a magnesium aluminate refractory especially resistant to spalling and to other severe conditions which fused refractories may be called upon to withstand.

We have discovered that when alumina is completely fused with from 2 to 10 per cent magnesia, and this fused mass cooled and formed into a refractory shape, the resulting material has a peculiar, characteristic microstructure which easily identifies it. This microstructure consists of minute interlocking crystals of magnesia spinel and crystalline alumina, practically free of glass, the spinel-like crystals predominating. These micro-crystals are often in skeletal forms, but the interlocking crystallization is characteristic. There is an eutectic formed in the alumina-magnesia series at about 8% MgO and 92% $Al_2O_3$, and it may be that this eutectic is the material observed. This fact is mentioned as a possible explanatory factor, but our discovery indicates certain observed advantages of such bodies whether or not the eutectic is responsible.

In the practice of our invention we may use magnesia in the form of calcined commercial magnesite, though we do not limit ourselves to that source. As a source of alumina we use different forms depending on the grade of refractory we are making. The alumina we generally use is a fused alumina by-product material from the manufacture of abrasive grains, and contains better than 95% $Al_2O_3$. We may use any source of alumina, however. Our preferred composition is about 5% magnesia and about 95% alumina. The composition limits may be varied from about 2% to about 10% magnesia. Beyond about 10% magnesia the characteristic structure tends to be lost and an undesirable homogeneous structure formed. Refractories made by this process lose their spall resistance when the amount of magnesia is increased much beyond about 10%. The criterion, however, is the microstructure as disclosed by petrograph examination and the spall resistance as found by test, and not merely composition.

In the production of refractories of our improved type the raw ingredients are first crushed to about ⅛" to ¼" and finer and then mixed together before fusion; although we have sometimes found it advantageous to vary this process in cases where the aluminous material used contains a considerable proportion of impurities, in which case, instead of mixing the materials together we first furnace the alumina with sufficient carbon to reduce out various impurities such as iron oxide and silica and thereafter add the magnesia to the molten alumina.

In either case, fusion is carried out in a furnace similar to that commonly used for the production of fused alumina for abrasive purposes generally consisting of water cooled iron shell without any lining other than that built up by the material being fused as it is fed into the furnace. Fusion is effected initially by the heat from an electric arc between two or more electrodes inserted in the iron shell; but after a bath of molten material is formed the resistance of this material to the passage of electric current through it is used to supply heat. The material is gradually fed in, and the electrodes raised as the fused mass is built up.

The furnace may be adapted either for tapping the molten material out through its side, or it may be arranged to be tilted so as to pour the material into the mold. Particularly in the latter case, it is desirable that provision be made to prevent molten material spilling into the water cooling system. This may be accomplished by the use of an iron apron properly positioned.

The molten material is heated to a temperature considerably above its melting point, and is then poured into molds which may be of granular refractory material bonded with a core binder such as is commonly used in foundry practice, or may be made of slabs of preburned refractory, of carbon, or of a suitable metal. These molds may be preheated if desired, and may be insulated to prevent too rapid loss of heat, by embedding them in a molding flask in which they are surrounded by sand or other heat insulating material.

The molds should be provided with risers of ample size to permit complete filling of the mold without interference by material freezing in the headers. If the riser is made wedge shaped with its minimum section immediately adjoining the mold, removal of the excess material constituting a header is facilitated. After a mold is filled it is moved away and additional molds also filled successively.

Instead of pouring the molten refractory material into molds, it is also possible to utilize the furnace itself as a mold, in which case it is desirable to line it with a very light coating of refractory material so that the molten material may extend out to the edges to form a smooth block. Charging is carried on just as before, the electrodes being gradually withdrawn and a block built up to the desired thickness. This method of molding has the disadvantage that only one mold can be filled at a time, but this is compensated for by the fact that practically no material is lost in headers, etc. as in the other type of mold. It is sometimes desirable to provide furnace molds of this type with a small dimensional draft to facilitate removal of the piece from the mold although due to the considerable shrinkage after solidification this is in general unnecessary.

The molded pieces may be left in the mold for heat treatment; or, in the case of metallic molds particularly, the pieces may be taken from the molds shortly after the outer walls of the casting have solidified and then annealed without other than their own support. The headers should be removed from the castings at this point by sledging, as the castings are tougher at this stage than when cold and there is less danger of their being cracked by the hammering. With a header tapering to a smaller sectional area next the casting, removal in this manner is usually simple and fairly clean.

For annealing we may utilize any of the customary annealing practices. After the pieces are cold any objectionable remainder of the header or other minor protuberances may be removed by chipping, or in minor cases by grinding.

Cast refractories made of magnesia and alumina in which this peculiar crystal structure predominates are far more resistant to sudden temperature changes than any cast refractories hitherto produced, and are moreover chemically relatively neutral, so that their field of application is very wide and includes applications where cast refractories are excellent for resisting slag but have heretofore been impossible to use because of their severe spalling tendencies.

We claim:

1. A fused cast refractory article produced from the fusion of about 2% to about 10% magnesia and the balance substantially alumina, the microstructure of the casting consisting principally of interlocking crystals of magnesia spinel and crystals of alumina.

2. A fused cast refractory article produced from the fusion of about 5% magnesia and at least 90% alumina.

3. A fused cast refractory article comprising 2% to 10% magnesia, the remainder being substantially alumina.

4. A fused cast refractory article comprising from 5% to 8% magnesia, the remainder being substantially alumina.

HENRY N. BAUMANN, Jr.
CHARLES McMULLEN.